March 6, 1962 M. L. HOPKINSON Re. 25,132
PNEUMATIC SHUTTLE ACTUATING MEANS
Original Filed May 13, 1949 9 Sheets-Sheet 1
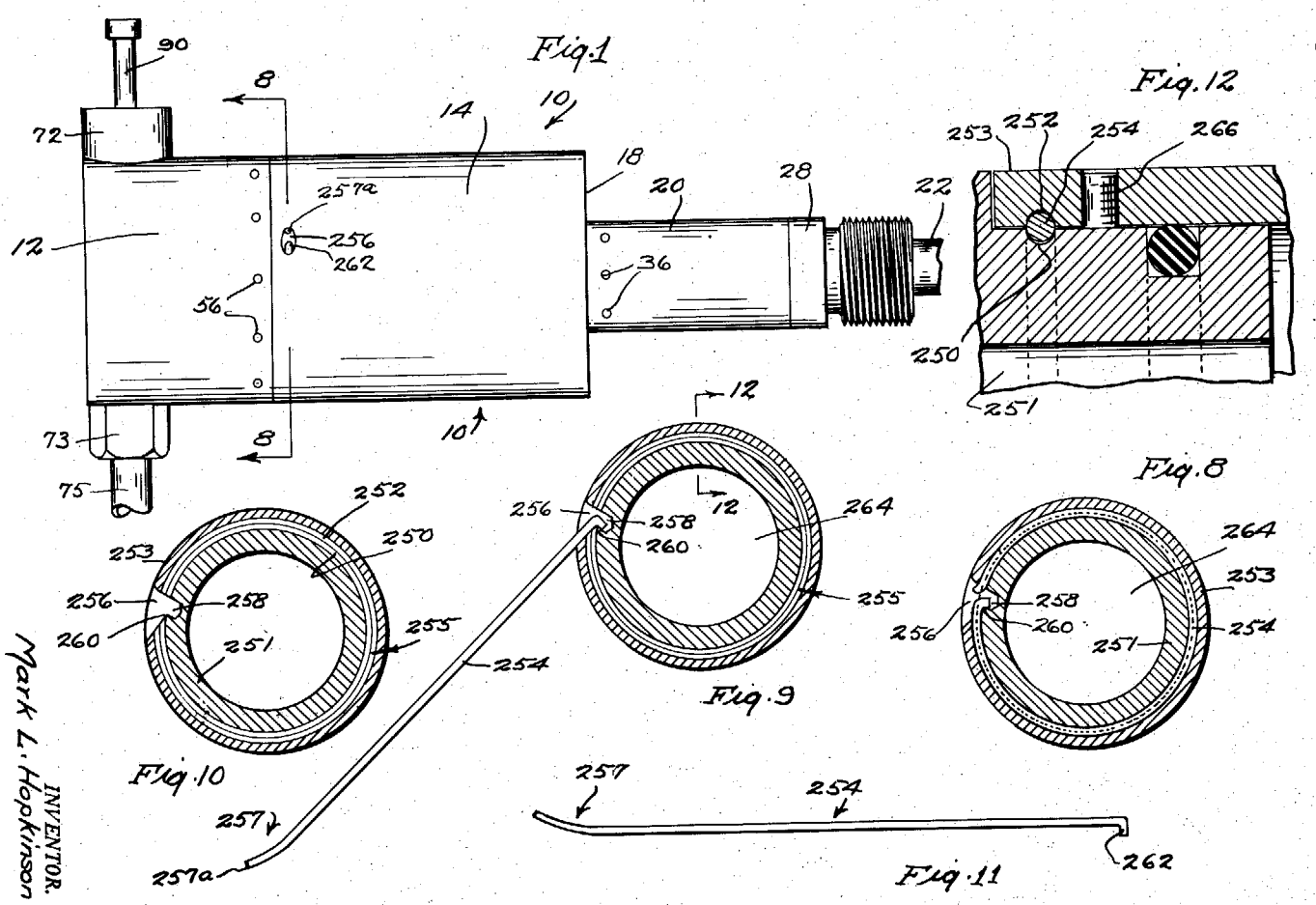
INVENTOR.
Mark L. Hopkinson
BY
Ralph S. Wooley
HIS ATTY PNEUMATIC SHUTTLE ACTUATING MEANS
Original Filed May 13, 1949 9 Sheets-Sheet 2
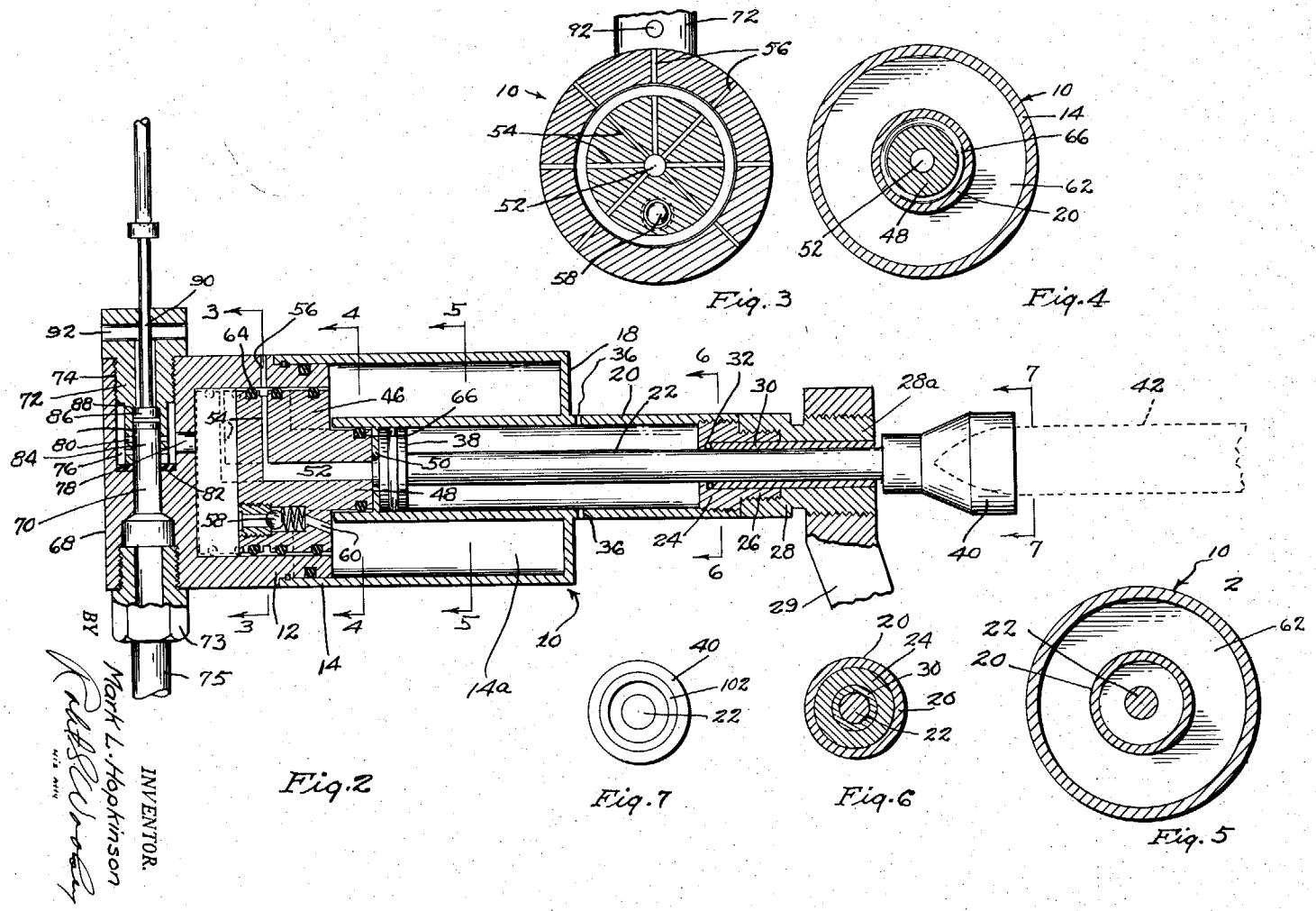
INVENTOR.
Mark L. Hopkinson
BY
Robert S. Wooley
HIS ATTY.

PNEUMATIC SHUTTLE ACTUATING MEANS

Original Filed May 13, 1949 9 Sheets-Sheet 3

INVENTOR.

Mark L. Hopkinson

Robert S. Woodey

ATTORNEY

PNEUMATIC SHUTTLE ACTUATING MEANS
Original Filed May 13, 1949 9 Sheets-Sheet 4
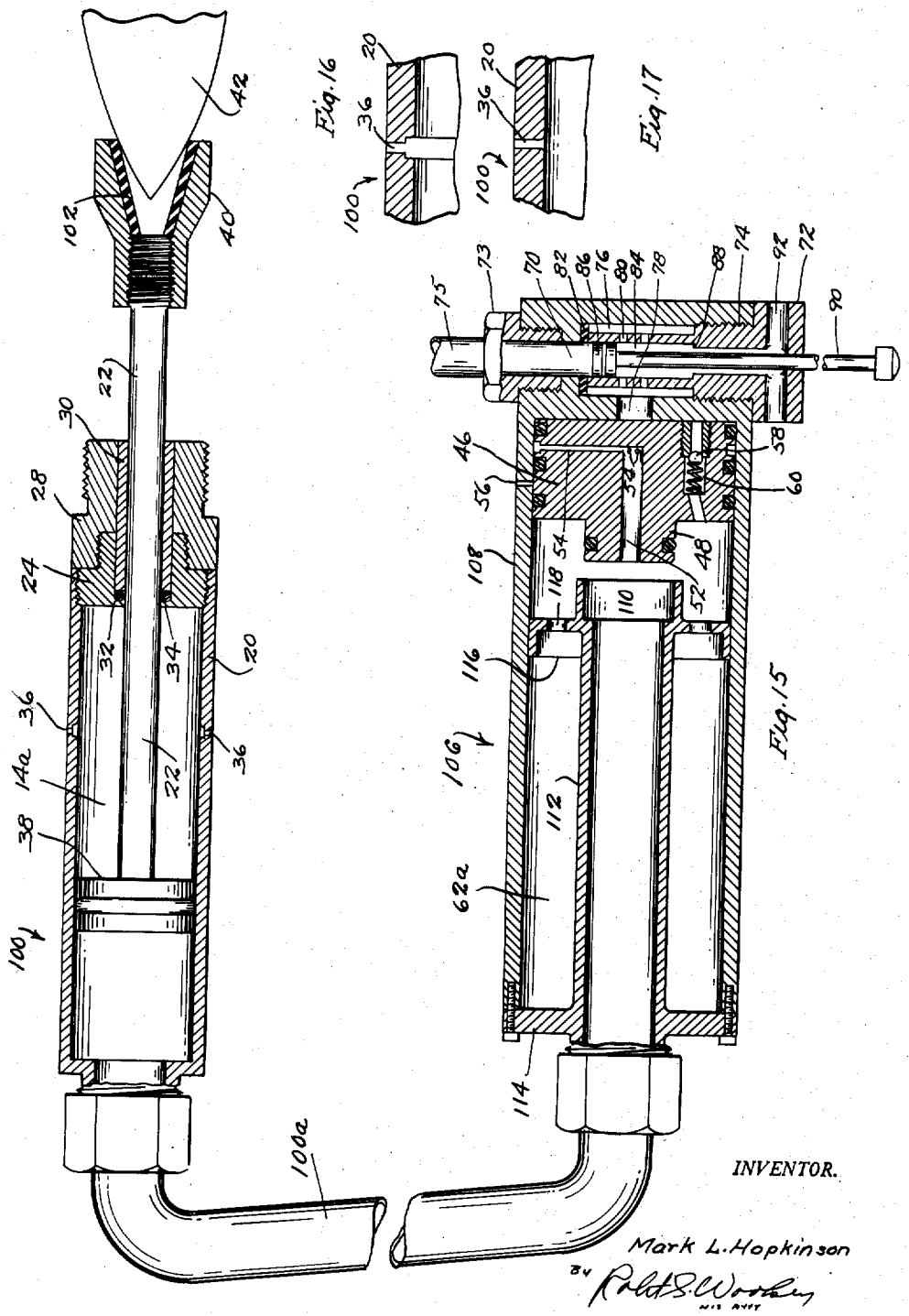

PNEUMATIC SHUTTLE ACTUATING MEANS

Original Filed May 13, 1949 9 Sheets-Sheet 5

INVENTOR.
Mark L. Hopkinson
Robert S. Wooley
HIS ATTY

PNEUMATIC SHUTTLE ACTUATING MEANS
Original Filed May 13, 1949 9 Sheets-Sheet 6
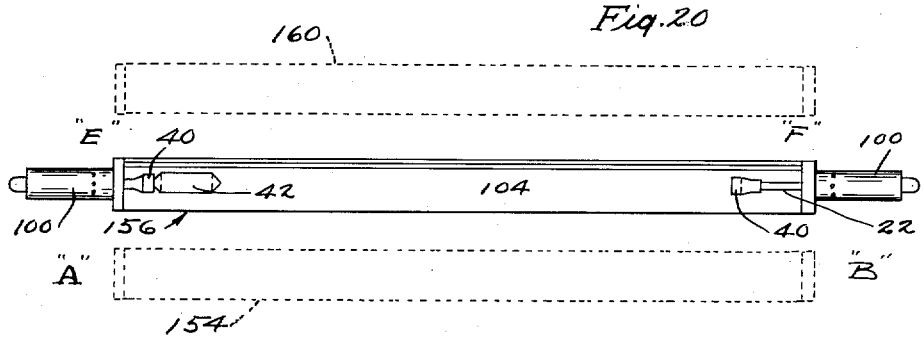
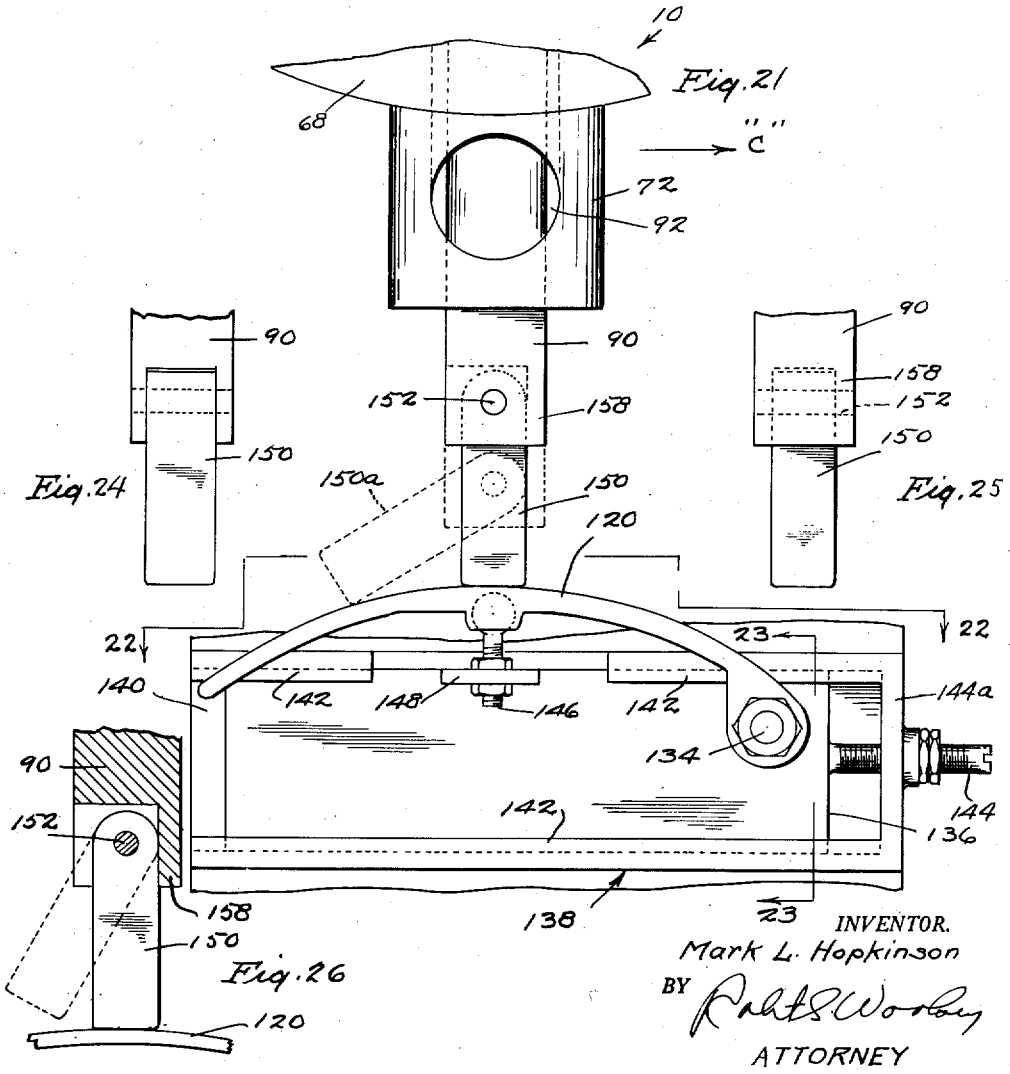
INVENTOR.
Mark L. Hopkinson
BY Robert S. Worthington
ATTORNEY

PNEUMATIC SHUTTLE ACTUATING MEANS

Original Filed May 13, 1949 9 Sheets-Sheet 7

INVENTOR.
Mark L. Hopkinson
BY Robert S. Woolley
ATTORNEY

March 6, 1962 M. L. HOPKINSON Re. 25,132

PNEUMATIC SHUTTLE ACTUATING MEANS

Original Filed May 13, 1949 9 Sheets-Sheet 8

INVENTOR.
Mark L. Hopkinson
BY Ralph R. Woolsey
HIS ATTY.

PNEUMATIC SHUTTLE ACTUATING MEANS

Original Filed May 13, 1949 9 Sheets-Sheet 9

INVENTOR.
Mark L. Hopkinson
BY Ralph S. Wooley
HIS ATTY.

United States Patent Office

Re. 25,132
Reissued Mar. 6, 1962

25,132

PNEUMATIC SHUTTLE ACTUATING MEANS

Mark L. Hopkinson, Los Angeles, Calif., assignor, by mesne assignments, to Modernair Corporation, San Leandro, Calif., a corporation of California Original No. 2,677,933, dated May 11, 1954, Ser. No. 93,038, May 13, 1949. Application for reissue June 28, 1961, Ser. No. 124,279
12 Claims. (Cl. 60—57)

Matter enclosed in heavy brackets [ ] appears in the original patent but forms no part of this reissue specification; matter printed in italics indicates the additions made by reissue.

The shuttle in all power looms of which I am aware, moves across the warp to lay the weft under impact of the free end of oscillatable picker sticks.

Those familiar with power looms are also aware of the awkwardness and cumbersomeness of the picker stick motion as a means to develop oscillatory power for movement of the shuttle; of the extensive and costly entrained power leverage system necessary for the operation thereof; of the inherent limitation upon the speed of weaving due thereto; of the frequent breakage of picker sticks with accompanying shut-down of the loom for replacement thereof; of the excessive vibration in the loom due to unbalanced movement of the picker sticks, a condition frequently resulting in crystallization of the working parts and breakage due thereto; of excessive and enervating noise which wears down the health and efficiency of loom attendants; of the disproportionate amount of power consumed by the picker stick motion as compared with the remainder of the power requirements of a loom; and, of the physical danger to attendants due to the very nature of the picker stick motion.

The foregoing remarks are pertinent objections to present day shuttle operating means, and as will be pointed out, are clearly at variance with the shuttle operating means of this invention, of and concerning which the following may be mentioned as being among the objects, features and advantages thereof.

(1) To provide a shuttle actuating device which is compact and direct acting without dependency upon extensive co-related rotating and reciprocating working parts.

(2) To provide a shuttle actuating device which creates more picks per minute than present shuttle operating means, and by reason thereof present a higher degree of loom operating efficiency than the presently accepted standard.

(3) To provide a shuttle operating means possessing a minimum mass, whereby upon operation of the stop motion due to breakage of the yarn or thread, the weaving operation may be more quickly arrested.

(4) To provide a shuttle operating means which is reliable, efficient and unfailing in operation, a shuttle actuating means which is not subject to torque or transverse strain whereby breakage or breakdown is quite impossible with respect thereto, and wherein failure is generally limited to cause based upon normal wear of associated parts to which any operating mechanism is subject.

(5) To provide a shuttle operating device which is quiet in operation.

(6) To provide a shuttle operating device which is cushioned and balanced in operation in such degree as to eliminate thudding, vibration and chatter.

(7) To provide a shuttle operating means which is without lost motion and accompanying shock whereby crystallization of working parts and breakage due thereto is eliminated.

(8) to provide a shuttle operating means which greatly reduces the in-put power requirements for over-all loom operation.

(9) To provide a shuttle operating means which reduces maintenance costs to a minimum.

(10) To provide a shuttle operating means which is swift and quiet in operation, the sound of which in operation is by its nature, not productive of unrest or irritability.

(11) To provide a shuttle operating means which is adapted by its nature to provide a safety factor for attendants which is unknown in the weaving art today.

(12) To provide a shuttle operating means which is adapted to attachment and functional use upon present day looms with a minimum conversion cost.

(13) Specifically, to provide a pair of pneumatically operated devices adapted to alternately propel and receive a shuttle for propelling along its race, the operating devices being so related to the shuttle and to one another as to direct and receive the shuttle medially of the longitudinal axes thereof, and which devices are adapted to arrest the end flight of a shuttle in its reciprocating movement or flight from the one to the other of the operating devices, together with other related structure adapted to effect timed sequence of operation thereof in synchronism with loom operation.

(14) To provide a novel means to accumulate and release compressed air for operation of extendable means to accomplish work, the release of accumulated compressed air being more sudden than the accumulation thereof whereby the force of released air is in the nature of an explosive action adapted to useful application.

(15) To provide a novel means to accumulate and release compressed air for operation of extendable means to alternately project and receive the shuttle in a power loom, the release of accumulated compressed air being obtained in a cyclic period of shorter duration than the accumulation whereby the release thereof is in the nature of an explosive force to obtain an initial maximum pressure thrust followed by a normally to be expected expansive pressure.

(16) To provide a novel means to detachably interlock contiguous, related, operative devices, said means comprising a half groove in each of the related devices whereby upon assembly, an internal annular groove of full circular form is created, and a flexible key adapted to be inserted within said annular groove by relative rotation of one of the related devices whereby upon application of an internal pressure within the contiguous, related devices, relative movement tending to separation thereof is inhibited by the resistance to shearing by the flexible key.

FIGURE 1 is a side-elevational view of a pneumatically powered piston adapted to various uses where a sudden uni-directional power thrust is a prerequisite, such as for example, in propelling a shuttle in a power loom, the operation of dies for stamping, for rock drills, and the like, this view incorporates in a single unit, the operating piston and cylinder, and the pneumatic charging cylinder whereby air is accumulated and released for operating the piston; and FIGURE 2 is a longitudinal sectional view thereof showing the disposition of internal working parts, and as an application of use, showing the device mounted upon a supporting bracket and provided with an adaptor to project a shuttle and to receive a spent shuttle after projection.

FIGURES 3 to 6 are sectional views as seen along transverse lines 3—3, 4—4, 5—5, and 6—6 in FIGURE 2 to show structure and disposition of parts not clearly illustrated in FIGURES 1 and 2; and FIGURE 7 is an elevational view taken along line 7—7 FIGURE 2.

FIGURE 8 is a transverse sectional view taken along line 8—8, FIGURE 1, showing my novel means to detachably interlock separable co-operative units of an assembly, the flexible key being in functional position, and the dotted line indicating the parting line of each of the separable parts.

FIGURE 9 is a similar transverse sectional view, but shows the flexible key at the point of beginning of placement within the internal annular groove formed upon union of the separable parts of the assembly; and FIGURE 10 is a detail also similar to FIGURES 8 and 9, excepting that here the annular groove formed by the separable parts is shown without reference to the previously mentioned key.

FIGURE 11 is an elevational view showing the flexible key detached from the parts with which it is adapted to cooperate.

FIGURE 12 is a sectional view taken along line 12—12, FIGURE 9, showing fragments of the cooperative parts of an assembly, the view shows the key in section, and includes a set-screw to prevent relative rotational movement of the separable parts of the assembly.

Figures 13, 14:
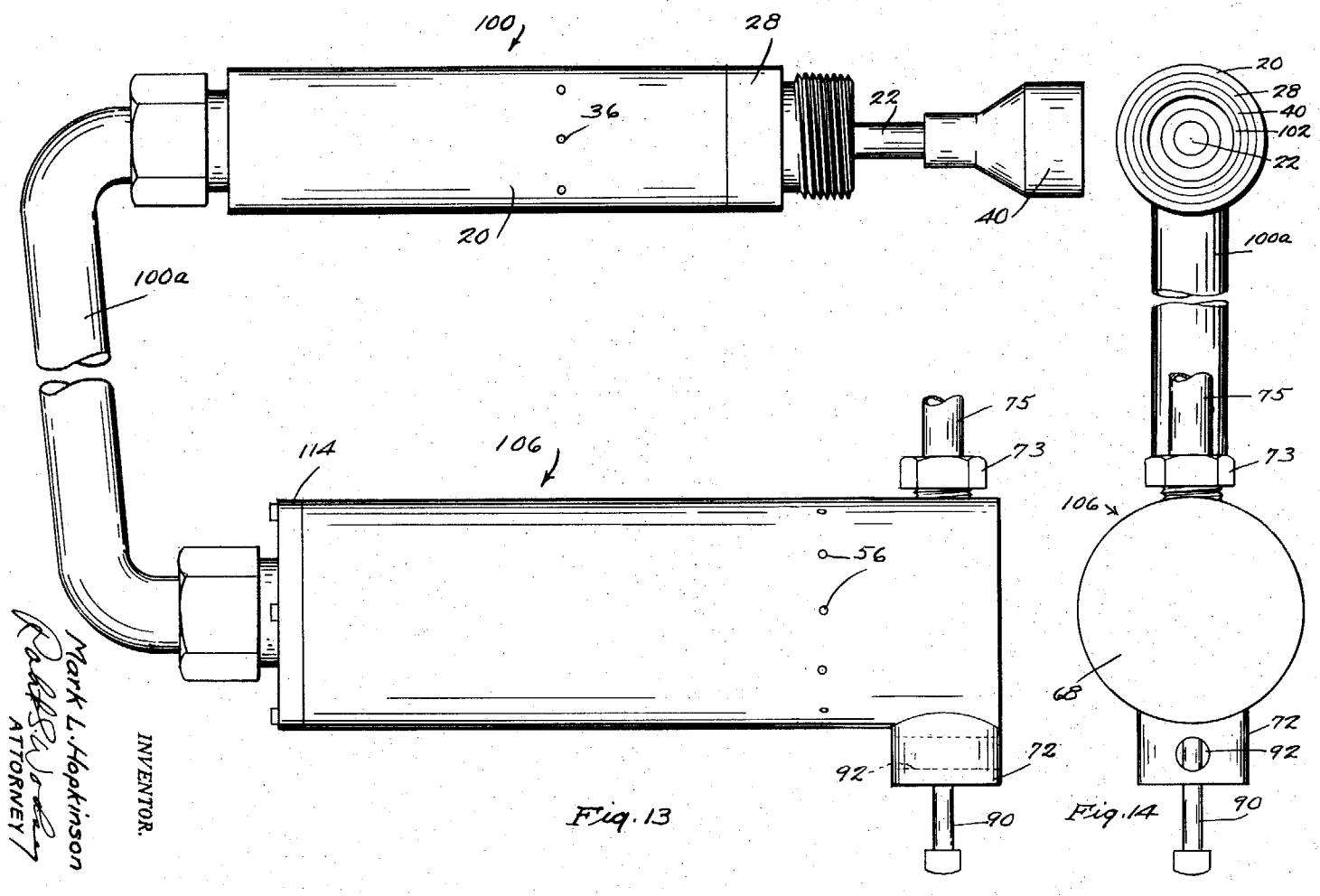

FIGURE 13 is a side-elevational view of a modified form of power unit, here the power piston and cylinder are detached from the pneumatic charging cylinder, this form of the basic construction shown in FIGURES 1 and 2, is particularly well adapted to functionally operate to propel and receive the shuttle or shuttles of a power loom; and FIGURE 14 is an end view thereof; while FIGURE 15 is a longitudinal sectional view thereof.

FIGURES 16 and 17 are detailed sectional views showing alternative forms of inner terminal finish for the vents in the power cylinder and in the charging cylinder, whereby chafing of the sealing ring is minimized in passing thereover.

Figure 18:
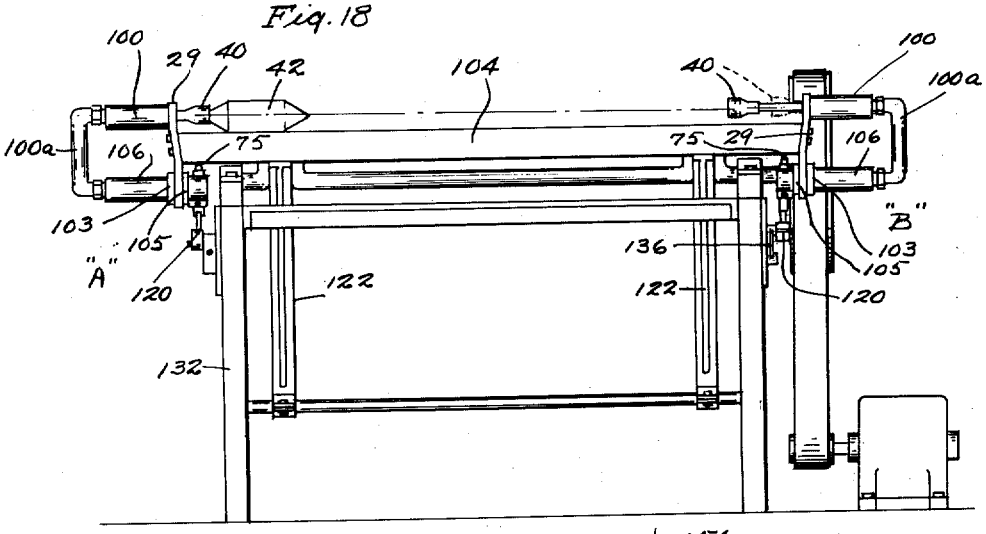

FIGURE 18 is a schematic view of the portion of a power loom with which the present invention is concerned, the view shows a pneumatically powered piston and cylinder, and charging cylinder of the type shown in FIGURE 13, attached by means of brackets to each end of the shuttle race, the view illustrates the mode of projection of, and receiving a shuttle in alternate directions, the piston which has previously projected a shuttle, being or remaining in position to receive the shuttle from the other piston prior to a next projection thereof.

Figure 19:
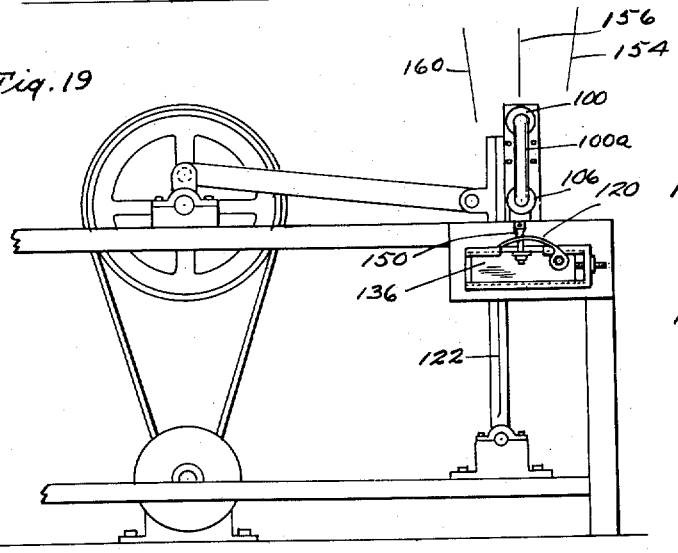

FIGURE 19 is a side-elevational view of the structure shown in FIGURE 18, and further illustrates means to operate the charging cylinder valve to cause the release of air to the piston in timed sequence with movement of the shuttle race, a similar, but oppositely disposed arrangement is positioned upon the other side of the loom.

FIGURE 20 is a top plan view of a shuttle race per se, and includes the power piston and cylinder in functional position thereon, the dotted lines indicate the extreme forward and rear positions of the race.

FIGURE 21 is an enlarged view showing a fragment of the charging cylinder and shows one form of cam device to effect operation thereof, including adjustments for the cam to bring it in precise timing with movement of the charging cylinder and the race upon which it is mounted.

Figure 22:
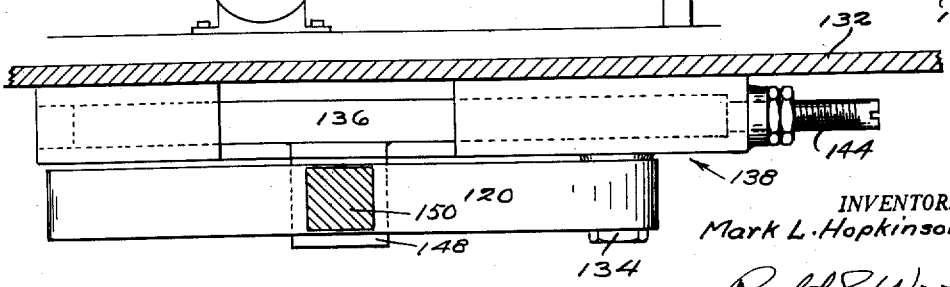

FIGURE 22 is principally a top plan view taken along line 22—22, FIGURE 21 showing the cam and related structure.

Figure 23:
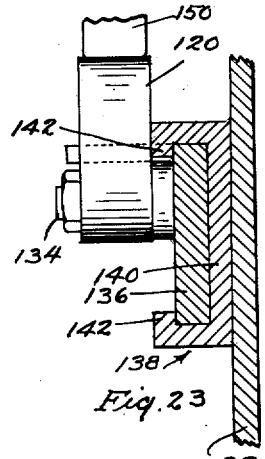

FIGURE 23 is a sectional view taken along line 23—23, FIGURE 21.

FIGURES 24, 25, and 26 are views showing a unidirectional swingable dog upon the valve stem of the charging cylinder, and of these views, FIGURE 24 is a front elevational view; FIGURE 25 is a rear elevational view; and FIGURE 26 illustrates the freedom afforded the dog in idle movement over the fixed cam, while a shoulder on the valve stem is adapted to hold the dog rigid, and in alignment with the valve stem when moving reversely.

Figure 28:
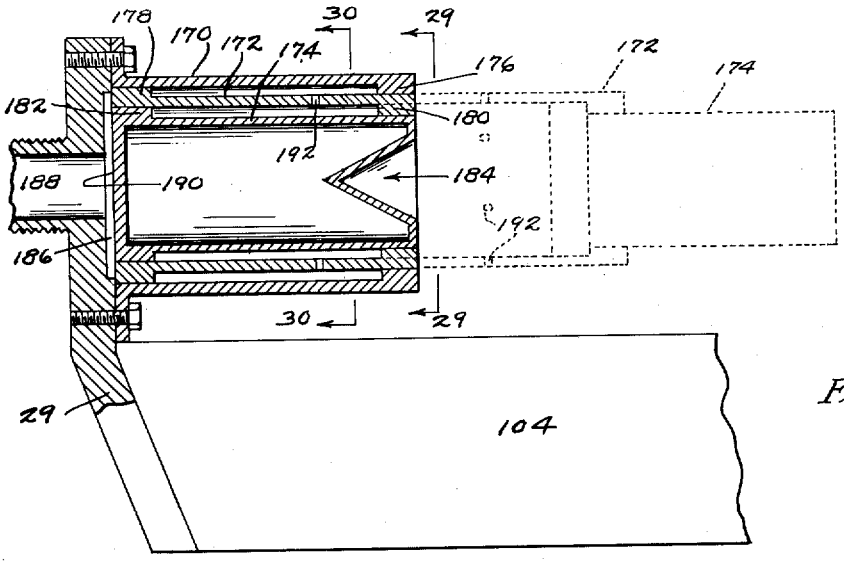
Figure 27:
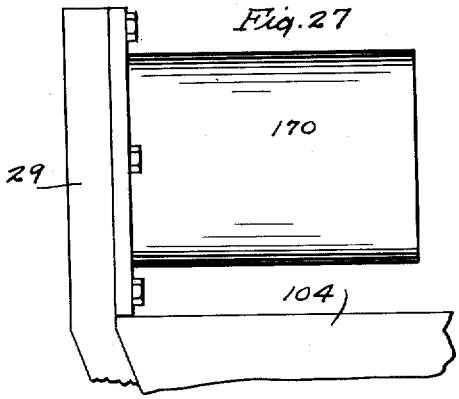

FIGURE 27 is an elevational view showing a plural number of nested, but extendable cylinders adapted to project and receive a shuttle, the device here shown is adapted to be used in lieu of the power cylinder and piston shown in FIGURE 13, in those instances where space limitations are a controlling factor, and is used in connection with the charging cylinder shown in FIGURE 13; and FIGURE 28 is a longitudinal sectional view thereof.

Figure 29:
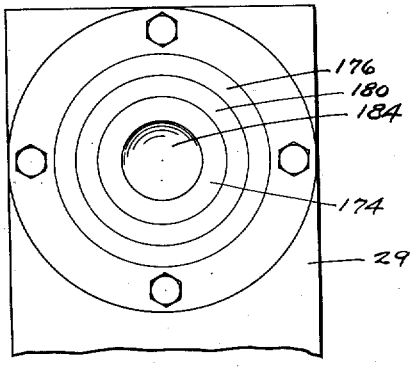
Figure 30:
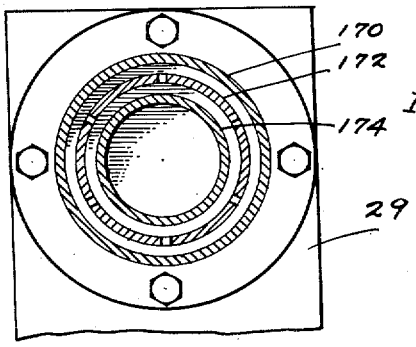

FIGURE 29 is an end view of the device shown in FIGURE 27, see line 29—29, FIGURE 28; and FIGURE 30 is a transverse sectional view taken along line 30—30, FIGURE 28.

Figure 31:
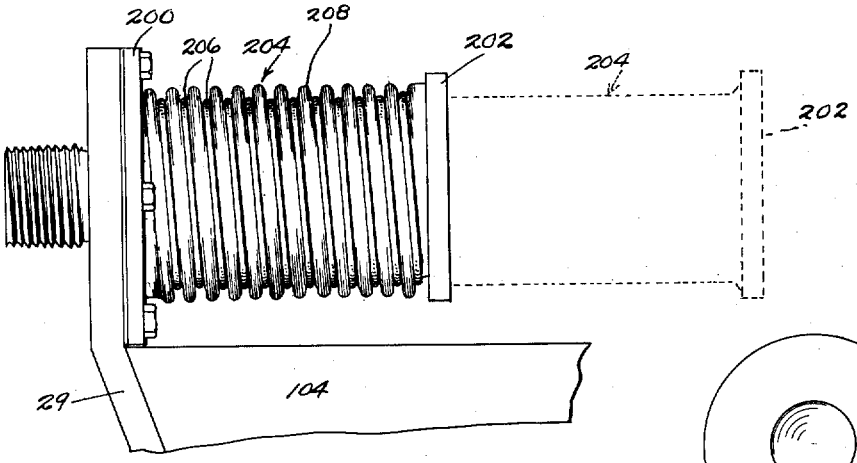

FIGURE 31 is illustrative of another form of extendable means adapted to project and receive a shuttle, here a bellows type structure having a shuttle adaptor in the head thereof is adapted to be substituted for the power piston and cylinder shown in FIGURE 13, and is adapted to meet particular conditions surrounding an installation involving the basic philosophy of the invention.

Figure 32:
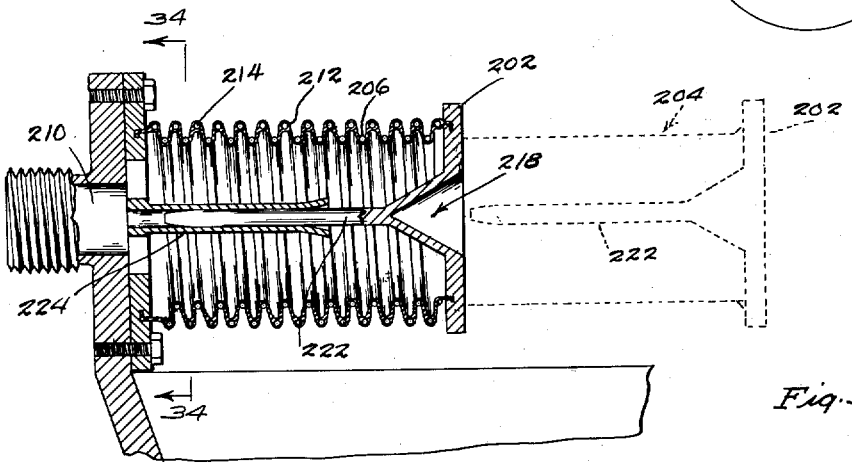

FIGURE 32 is a longitudinal sectional view thereof.

Figure 33:
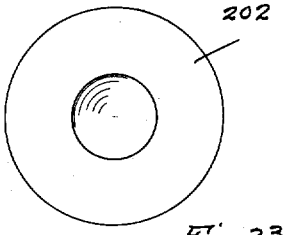

FIGURE 33 is an end elevational view thereof; and

Figure 34:
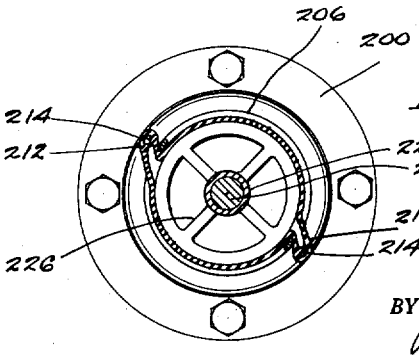

FIGURE 34 is a transverse sectional view taken along line 34—34, FIGURE 32.

Figure 35:
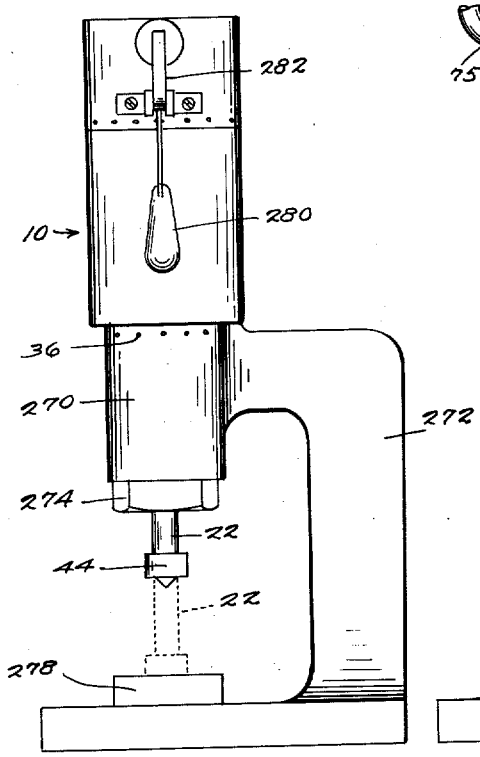
Figure 36:
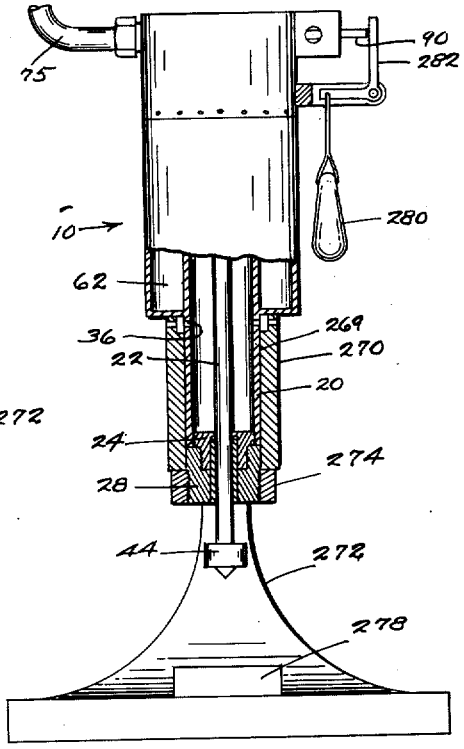

FIGURE 35 is a side elevational view showing the power unit illustrated in FIGURES 1 and 2 mounted upon an arbor to provide a pneumatic press or die stamping structure; and FIGURE 36 is a front elevational view thereof showing portions of the unit broken away to better illustrate one means of securing the unit to the arbor.

To facilitate prosecution of this application, the applicant will group the several structural features of the disclosure in their relative order with respect to the basic conception, that is, pneumatic means to actuate a shuttle.

Within this grouping, there is, (1) the power cylinder and piston formed as a unit with the charging cylinder; (2) the power cylinder and piston formed as a unit with the charging cylinder, plus the shuttle and shuttle race in combination; (3) the power cylinder and piston formed separately from the charging cylinder, plus the shuttle and shuttle race in combination; (4) the extendable telescopic sleeves, plus the charging cylinder, and the shuttle with its race, in combination; (5) the extendable bellows type sleeve and charbging cylinder, plus the shuttle and its race in combination; (6) the power unit illustrated in FIGURES 1 and 2, in combination with an arbor for press or stamping work; (7) the device shown in FIGURES 1, and 8 through 12 to detachably inter-lock separable parts of a unit.

Reference is now made to FIGURES 1 and 2 wherein I show a pneumatic power unit combining in a unitary structure 10, a power piston and cylinder, together with means to accumulate and release compressed air for operation of the piston. The structure 10 comprises a housing formed of the cylindrical shells or half-portions 12 and 14 which are brought together in overlapped, slidable abutment, and which are securely, although detachably joined together as will be hereinafter fully described. The end wall 18 of the cylinder portion 14 is provided with a medially aligned and longitudinally disposed power cylinder 20, positioned partially within and partially without the cylinder.

The cylinder 20 is provided with an externally threaded closure or end wall 24 for threaded union therewith, and is provided with an externally threaded boss 26 upon which there is positioned a like threaded coupling 28 in medial longitudinal alignment therewith, and this coupling is threaded at 28a for screw attachment to a bracket 29, or other support, such as an arbor for press work.

A tubular sleeve 30 within the closure and coupling is adapted to retain a sealing ring 32 in functional position around the piston rod 22 and against an inwardly projecting annular shoulder on the closure 24. The cylinder 20 is formed with a plural number of radially disposed vents 36 which serve to permit the escape of air forwardly of the piston head 38 during its power stroke, after having passed the vents 36, air which is trapped between the closure 24 and the piston head is compressed and serves to cushion the piston at the end of its power stroke, while an adaptor 40 for a shuttle 42 is securely positioned upon the free end of the piston, although insofar as the power unit is concerned, other devices, such as a die, could be substituted for the shuttle as a means of useful application.

The cylindrical shell 12 is provided with a flutter valve 46, the one end of which is a plane surface, while the other end is formed with a boss-like extension or valve element 48 for seating in the inner end of the power cylinder 20, and comes to rest in abutment with an annular flange 50 therein and which serves as a stop therefor, as well as also acting as a stop for the piston when it is returned to the point of its beginning under impetus of an incoming shuttle, as will hereinafter be described.

As the drawing shows, the flutter valve 46 is provided with a central bore 52, the inner end of which terminates in a plural number of radial vents 54 which extend through the surface of the valve and are adapted to be brought into register with similar radial vents 56 extending through the wall of the shell 12 upon movement of the valve from one to the other of its two extreme positions.

A spring pressed ball check-valve 58 in a bore 60 which extends through the body of the flutter valve, permits compressed air to flow from the one side thereof to the other and thence to the chamber 14a. A plural number of seals 64 are placed in suitable grooves around the body of the valve to limit loss of air from one side to the other thereof, and likewise, a seal 66 upon the boss or valve 48 serves the same purpose.

The end 68 of the shell 12 is dimensioned to provide accommodation for a passage-way 70 of varied section across the diameter thereof, and which at its one end is adapted to receive a screw plug 72 and at its opposite end to receive a screw fitting 73 for an incoming pressure air line 75. The plug 72 is also of varied section, that is, its upper portion is threaded for screw fitting at 74 into the bore or passage-way 70, while inwardly thereof the plug is stepped down in section to provide an annular chamber 76 in ported communication with the inside of the shell 12 as indicated at 78. A plural number of ports 80 in the lower part of the plug 72 are adapted to enable pressure air to flow from the line 75 to the interior of the unit 10, as will be hereinafter described or set forth in the description of operation.

The annular chamber 76 is sealed at 82 against incoming pressure air except through the ports 80. A passage-way 84 extends medially of the length of the plug 72 and is in end communication with the bore 70 and provides a seat for a piston type valve 86 which is movable from a position in abutment with the shoulder 88 to a point below the ports 80 so that air may be cut-off from flowing therethrough. From the shoulder 88 outwardly, the passage-way 84 is of reduced section, yet is large enough to provide an elongated annular bore through which the valve stem 90 extends, and through which exhaust air may flow to the ports 92 and atmosphere.

The pneumatic power unit described is adapted to perform various services where it is necessary to overcome: (1) a degree of resistance based, initially upon inertia together with a possible clutching action upon the work; (2) to impart high velocity to the work; (3) to impart high velocity plus a continuing pressure to the work after momentum has been established.

In FIGURES 13, 14 and 15, I show a modified form of the basic construction previously described, the principal difference being that in this disclosure the piston and cylinder are formed as a unit separate from the pressure air charging cylinder or unit, the separated units being joined by a manifold 100a for passage of compressed air, and in the following description thereof, like structural features will be given the reference character used in connection with the description of FIGURES 1 through 12 where applicable.

The power unit 100 comprises a piston rod 22 and a piston head 38 which are operable in the cylinder 20, the piston rod being power actuated in one direction through the sleeve 30 in the closure 24 and the coupling 28, and is provided with an adaptor 40 upon the free end thereof. The adaptor is essentially bell shaped and the interior surface thereof is lined with a resilient material 102 such as rubber or rubberized fabric so as to absorb and cushion the impact force of a shuttle 42 which has previously been ejected by a like power unit upon the shuttle race, see FIGURE 18.

The pressure air charging unit 106 is in all essential detail identical to that part of the unit 10 heretofore described, and is of identical functional service, being provided with a cylindrical housing 108 within which a flutter valve 46 is adapted to move through a limited range under air pressure, and which valve is provided with a boss-like extension or valve element 48 for seating within the annular recess 110 formed in the inner end of a tubular extension 112 of the closure 114. A spider 116 supports the inner end of the tube 112 medially of the longitudinal axis of the unit 106 whereby the valve element 48 is in constant alignment with the recess 100 for repetitious seating therein. The spider is formed with openings 118 to permit movement of pressure air therethrough to the chamber 62a during the accumulation period, as well as to permit a reverse flow thereof to the tube 112. The flutter valve 46 is provided with a medial and longitudinally disposed bore 52 and with radial vents 54 extending from the inner end thereof for cyclic register with the radial vents 56 which extend through the wall of the unit 106 to permit the escape of air therethrough.

The unit 106 is also provided with an air inlet line 75 and a bore 70 to enable air to flow to the interior of the fitting 72 and thence through ports 80 to the chamber 76 and through port 78 to the interior of the unit 106, and in like manner, a piston valve 86 is adapted to abut and rest against a shoulder 88 in the bore 70, and is adapted upon movement to its opposite position in the bore 70, in response to cam pressure, to permit the exhaust of air outwardly through the annular chamber 84 to the ports 92 and to atmosphere.

In FIGURES 18 and 19 I show a pair of the units 100 and 106 mounted in brackets 29 upon the ends of a power loom shuttle race 104.

The present invention is not concerned with the operation of a power loom per se, suffice to state, that the race 104 is oscillatable with and upon swords 122, and that this oscillatory movement occurs in timed sequence with operation of the loom as a whole in weaving cloth, and that the weft is laid by the shuttle as it moves back and forth across the race, hence it follows that movement of the shuttle along the race involves precise timing to admit air to the power pistons so that alternate unidirectional operation thereof may be had in synchronism with the other parts of the loom whereby a repetitious operation takes place.

In FIGURES 18 and 19 I show upon the frame of a loom, the location of cams adapted to effect periodic and cyclic operation of the charging units 106, while in FIGURES 21 through 26 I show this structure in detail as a means to effect operation of the piston valve 86 whereby air is exhausted from the units 106 as a means to cause accumulated pressure air in these units to flow to the piston for functional use.

Since the shuttle 42 moves from the end A to the end B of the race, and then in reverse order, and since I prefer in the present disclosure to show a cam 120 which is stationary upon the frame 132, it is necessary that upon a single movement of the race, that one of the valves 86 be functionally operated in passing over the cam, while the other is inoperative, and conversely with respect to the other valve. To accomplish this action I provide a cam 120 for each unit 106. Each cam is fulcrumed upon a stud 134 which is fixed upon a plate 136 which is longitudinally slidable within but held against lateral movement by a guide 138 having a back face plate 140 and spaced parallel lips 142, and which guide is fixedly positioned upon the frame 132 by any suitable means. A screw 144 attached to the plate 136 and threaded through a web 144a in the guide, is adapted to provide means to adjust the crest of the cam with respect to the medial vertical axis of the valve stem 90. A screw 146 having its bite in the flange 148 upon the plate 136 is adapted to raise and lower the crest of the cam with respect to a swingable dog 150 which is pivotally positioned in the valve stem 90, so that accuracy of vertical adjustment thereof may be had to effect properly timed movement of the piston valve 86.

As the drawing shows, the dog 150 swings laterally upon its pivot when the unit 106 moves in the direction of the arrow C and then swings back to pendent position after clearing the cam 120 in moving to either the position at 154 or 160 in dotted lines in FIGURE 20, the full line position 156 being the position of the race when the shuttle is released, while a shoulder 158 on the valve stem supports one side of the dog in its opposite movement over the cam 120 so as to apply an in-line pressure upon the valve stem, whereby the valve 86 is forced across the ports 80 so that incoming pressure air is cut-off, and pressure air is enabled to exhaust from the space between the face 46b of the flutter valve and the adjacent end wall of the unit 10 thereby permitting functional operation of the piston as will be hereinafter set forth.

It is assumed that the previous descriptive matter refers to the power unit at the end A of the shuttle race then operation of, and release of pressure air from the charging unit 106 at the end B of the shuttle race is controlled by reversal of position of the parts just described, for it is necessary that the application of power to the shuttle be had at approximately the full line position 156 after having moved from the dotted line position 160.

The structure hereinbefore described is readily installed upon a power loom in lieu of the means heretofore employed to actuate a shuttle, the installation being easily and quickly substituted for the present cumbersome and in fact, primitive picker-stick, however, it is possible that in certain instances, because of space limitation, the power piston structure previously described would be ill adapted to use, accordingly, and to meet such situations, I have conceived a structural modification of the basic philosophy thereof which I will now described, and which modification is adapted to be used in combination with the pressure air charging unit 106.

This modification is shown in FIGURES 28 through 30, and comprises a plural number of cylindrical sleeves 170 and 172, and a closed cylinder 174 which are adapted to telescopically fit together to form a compact unit of approximately the length of a single one of the parts thereof, and of which sleeves, the sleeve 170 is fixedly secured to the bracket 29 upon the race 104.

The sleeve 170 is formed with an annular shoulder 176 which serves as a guide and a stop for sleeve 172, which is also formed with an annular shoulder 178 upon the outer surface of the inner end thereof, while a similar shoulder 180 is formed upon the inner surface of the outer end of sleeve 172, and is adapted to provide a stop for the shoulder 182.

The forward end of the element 174 is recessed to provide an adaptor 184 for a shuttle 42. The inner face of the bracket 29 may be recessed as shown at 186 so that pressure air flowing through the inlet port 188 from the manifold 100a will be in effective contact with the whole of the exposed end 190 of the element 174, and in contact with a substantial portion of the adjacent end face of the tube and flange 172 and 178, whereby an initial high velocity may be imparted to the movable elements of the unit.

A series of radially disposed vents 192 extend through the wall of the sleeve 172 and are uncovered upon extension of the unit as shown in dotted lines, see FIGURE 28, so that pressure air used to force the parts 172 and 174 forwardly may be exhausted to atmosphere, while air which is entrapped in the space between the parts 170 and 172 and the shoulders thereof, serves to cushion the forward impetus of the mass thereof. It is to be noted that each of the shoulders mentioned not only serve successively as stops for the slidable elements of the unit, but that they also serve as aligning guides therefor to support the unit in unfailing alignment for use in actuating the shuttle.

In FIGURES 31 through 34 I show another modification of extendable construction which is adapted to actuate a shuttle upon a loom race, and which lends itself very well to those installations where space is a prime consideration and in which compactness is essential.

The construction here shown is generally that of an accordion, that is it has foldable sides which upon the application of an internal air pressure will cause the outer end to be extended to project a shuttle, and comprises a back plate 200 and a front plate 202 which are joined by a longitudinally extendable accordion-like tube 204 the ends of which are molded into annular grooves in the plates. The part 204 is preferably formed of rubber and has concentric bands 206 of steel wire placed upon the exterior surface thereof and lying between each of the folds and which serve to limit lateral expansion under pressure of air which enters therein through the inlet port 210 from the charging cylinder 106. The folds 206 are helical in nature and have a continuous length of steel wire 214 imbedded in the outer bend 212 thereof, and which being resistant to extension, naturally tends to facilitate return to normal compactness in cooperation with the force applied by an inbound shuttle.

The plate 202 is recessed to form an adaptor 218 for actuation and reception of a shuttle 42, and the inner end of the adaptor is provided with a rod-like extension 222 which is adapted to slidably move in and out of a tubular guide 224 whereby the unit is provided with guidance, particularly during the initial stage of a forward extension. The tube 224 may be integrally formed with a spider 226 cast or formed as part of the plate 200, and enables pressure air to flow to the unit through the port 210 as aforementioned.

In FIGURES 1, and 8 through 12, I show a novel means to detachably join and secure together the separable elements of a construction to form a unitary whole, and this arrangement is particularly well adapted to use when the separable elements are tubular and the mated ends of the unitary whole are over-lapped and in end abutment as shown in FIGURE 12.

The construction involves the milling of an annular groove 250 in the outer face of the inner part 251, and this groove is slightly deeper than a one half circle, as shown in FIGURE 12, and the milling of a like groove 252 in the inner face of the outer part 253 so that when the parts are in union, the completed annular groove 255 is that of a slightly elongated circle in transverse section, and this configuration is had to facilitate the feeding in of a flexible steel key 254 through an elongated opening 256 which extends through the wall of the outer part 253 and terminates in a pit or recess 258 in the inner element 251 whereby an edge 260 is formed for engagement with the hook 262 upon the one end of the key 254 as shown in FIGURE 9. The tail of the key is slightly curved at 257 oppositely from the inclination of the hook. When the key is placed in functional position by first engaging the hook 262 upon or with the edge 260 and then rotating the structure of which the edge 260 is an element, in a clockwise direction, the whole of the key is drawn down into the annular groove so that the curved end portion 257 is reversely bent and lies therein, but with the tip 254a thereof visible through the opening 256.

Upon reverse rotation of the part 251, the hook is carried backwardly and the portion 257 reforms itself as it is progressively exerted from confinement within the groove 255.

Since the part 257 is reformable in an outward curve from the unit, withdrawal of the key is facilitated, or otherwise the tip end 257a would bite into the sides of the opening 256 and interfere with its free withdrawal from the groove 255.

If a fluid pressure exists within a chamber 264 formed by union of the detachable parts, the tendency of the parts to slip apart is resisted by the shearing resistance across the diameter or width of the key through the whole of the length thereof, and constitutes a resistance which serves to provide an exceedingly strong inter-locking means. A screw 266 may be used to prevent rotation drift of the parts, especially if they are subjected to vibration.

The structure herein shown and described forms a simple efficient, strong, and easily used unobtrusive means to detachably join the separable elements of an assembly of the nature described, or of other parts susceptible of similar end joining.

The pneumatic power unit shown in FIGURES 1 and 2 is well adapted to a number of industrial uses, among which may be mentioned, pneumatic hammers and presses.

In FIGURES 35 and 36 I illustrate the use of the power unit in combination with an arbor for support to form an industrial press. The cylinder 20 of the power unit shown in FIGURES 1 and 2 may be placed in the bore 269 of the neck 270 of the stand 272, and can be secured therein by a nut 274 upon the threaded end of the cylinder assembly. A die such as that shown at 44 upon the piston 22 is adapted to apply an impression to the work 278 upon manual operation of a hand grip 280 which rocks a bellcrank 282 to push the valve stem 90 inwardly to actuate the charging cylinder 12 as hereinbefore described whereby the piston 22 is forcibly actuated to apply the die to the work for any useful purpose.

The preceding descriptive matter is principally directed to pneumatic power means to operate a power loom shuttle to lay the weft in weaving cloth.

In certain instances the unit 10 (see FIGURES 1 and 2) is adapted to accomplish this purpose. In other instances the unit shown in FIGURES 13, 14 and 15 is best adapted to actuate a loom shuttle, while in still other situations where loom clearances are small, the structure shown in FIGURES 27 through 30, or in FIGURES 31 through 34 is best adapted to use.

In view of the above statement, the following description of operation as applied to a loom, will be directed to the species of the invention shown in FIGURES 13, 14, and 15, with but passing reference to the modifications thereof.

The piston unit 100 is screw attached to the bracket 29 so as to place the adaptor 40 in medial longitudinal alignment with the accepted course of shuttle travel, and the charging unit 106 is secured in the other end of this bracket, as between the bands 103 and 105 (see FIGURE 18) to secure the valve stem 90 in such position as to be forced inwardly as the shuttle race passes over the work surface of the cam 120. In this connection it is also to be noted that the dogs 150 in the valve stems 90 are adapted to swing in clearance of the cam when non-functionally passing thereover, that is, in moving from the dotted line position 160 to the dotted line position 154, but that the dog is rigidly supported in moving from the position 154 to the full line position 156, which position is the normal position of the race at the moment the shuttle is projected from the end A thereof, and the opposite thereof is true with respect to the charging cylinder position B, for here the assembly passes over a like, although reversely positioned cam 120, and in which position the dog swings in clearance of the cam in moving from position 154 to 160, but is held rigid in moving from position 160 to position 156, which position is the firing position of the shuttle from the end B of the shuttle race. It is also to be noted that with the line 75 connected to a source of pressure air, the valve 86 is normally seated against the valve stop 88 so that air will flow through the ports 80, across the chamber 76 to the port 78 and cause the flutter valve 46 to move to a position in which the valve 48 is seated within the recess 110 which position stops further movement thereof so that thereafter air pressure builds up within the space created upon movement of the valve 46, in sufficient degree to unseat the ball check valve 58, and flowing therethrough, fills the chamber 62a so that both sides of the valve 46 are under equal air pressure, and this condition remains static until the valve stem 90 is pushed inwardly by the cam 120, whereupon the piston valve 86 passes over and across the ports 80 so that line pressure is cutoff and air in front of the valve 46 is permitted to exhaust through the port 78 and outwardly through the bore 86 to the ports 92 and to atmosphere.

Since the flutter valve was previously in static balance, the sudden release of air pressure causes it to move back to its point of beginning so that the pressure air previously accumulated within the chamber 62a, now rushes through the openings 118 in the spider 116 and into the tube 112 and the manifold 100a to the power cylinder 20 to force the piston and adaptor outwardly with sufficient force to cause the shuttle to travel the length of the race for socketing within the adaptor upon the extended piston of the other power unit. During this movement of the piston rod 22, air between the head 38 and the closure 24 partially escapes through the vents 36. After the piston head 38 passes the vents, the remaining air is entrapped and serves to cushion the head to prevent hammering, but at the same time, pressure air which pushed the piston past the vents is enabled to escape therethrough to atmosphere, the piston traveling the distance from the vents to the closure 24 under a combination of forces represented by a diminishing air pressure in the cylinder, and by the momentum of the piston and adaptor. After the piston has traveled its full stroke, it remains in extended position until driven back to the point of its beginning under the impact of a shuttle moving from the other end of the race.

If the operation just described is considered as being from the end A of the shuttle race 104, and that the shuttle has been driven to position B, a reversal of the operation causes the shuttle to force the piston rod 22 into the cylinder 20 so that air within the cylinder is expelled through the manifold 100a and through the tube 112. During this interval the valve 86 will have again returned to normal position so that line pressure will have again forced the flutter valve to a position closing the inner end of the tube 112 so that as air is expelled therefrom under impetus of the shuttle, it flows through the passage-way 52 and through the radial vents 54 and 56 to atmosphere as shown in FIGURE 2, and in dotted lines in FIGURE 15.

The operation described is that involved in a single, complete cycle of shuttle movement, and is inclusive of the functional operation of the several parts involved in the power unit. The matter of precise timing for operation of the valve 86 through manipulation of the adjustments 144 and 146 is a matter of spot requirement and is perhaps variable with each installation, but regardless thereof, is believed to be clear and within the understanding of any person of sufficient skill and ability to install and service power looms.

The operation of the modified forms of the invention shown in FIGURES 27 through 30, and in FIGURES 31 through 34, is believed to be readily understandable, for the structures shown are merely extendable under incoming air pressure and are returnable to their points of beginning under impact of an in-bound shuttle, and in both of these modifications of the conception, the pressure air required for operation thereof, finds its timed release in the charging unit 106 which is connected to either of the modifications by means of the manifold 100a.

The use and application of the interlocking device shown in FIGURES 1, and 8 through 12 is believed to be understandable without further statement, while the application of the power unit shown in FIGURES 1 and 2 to the arbor illustrated in FIGURES 35 and 36 is also thought to be clearly understood without further comment.

Therefore, having thus described my invention in its presently preferred form, but without limitation thereto, that for which I seek Letters Patent, is as follows.

I claim:

1. In a pneumatic device to apply an intermittent unidirectional piston pressure, a housing means in said housing to admit pressure-air thereto, a piston and piston cylinder in the housing, and valves, one of said valves being operable to create compartments in the housing and to seal an adjacent end of said piston cylinder, another of said valves being seated in the first mentioned valve so as to enable pressure-air to flow therethrough from one compartment to the other thereof for accumulation, and other valve means to permit exhaust of pressure-air from one of the compartments in the housing whereby said first mentioned valve moves to its point of beginning to release accumulated pressure-air from the other of the compartments to said piston and piston cylinder.

2. In a pneumatic device to apply an intermittent, unidirectional piston pressure, a housing, a piston and piston cylinder, the piston having a working direction of movement and a return direction of movement, valves in said housing, one of said valves being adapted to limited longitudinal movement in the housing from a non-functional position whereby a first compartment and a second compartment is formed therein, means to admit an intermittent flow of pressure-air to said first compartment, means to by-pass air from said first compartment to said second compartment for accumulation thereof, and a valve to exhaust pressure-air from said first compartment whereby internal pressure within said housing is unbalanced to effect return movement of said first mentioned valve to non-functional position and whereby released pressure-air in said second compartment flows to said piston and piston cylinder use to effect movement of the piston in its working direction.

3. In a pneumatic power device to apply an intermittent unidirectional piston pressure, a cylindrical housing, a piston cylinder having an open end in the housing and a piston operable in the cylinder, a valve adapted to move from one end of the housing to a position adapted to seal the open end of said piston cylinder so as to form a first compartment and a second compartment in the housing, means to by-pass pressure-air from said first compartment to said second compartment for accumulation thereof, an unimpeded passage-way to admit pressure-air to said first compartment for by-passing to said second compartment, a second valve, said second valve being operable in said passage-way to cut off inflowing air and to permit exhaust thereof from said first compartment whereby upon unbalancing of air pressure within said compartments said first mentioned valve moves to its point of beginning thereby releasing accumulated pressure-air within said second compartment to said piston and piston cylinder, and means to permit exhaust of spent pressure-air from said piston cylinder.

4. The device as set forth in claim 3, and wherein, said means comprising vents extending through the walls of said piston cylinder.

5. In a pneumatic power device to apply an intermittent uni-directional piston pressure to work, a hollow cylindrical housing, a piston cylinder having an open end in said housing and a piston operable in the cylinder, a valve adapted to move from one end of the housing to a position sealing the open end of said cylinder whereby a first compartment and a second compartment is formed in the housing, means in said valve to by-pass pressure-air from said first compartment to said second compartment for equalized pressure accumulation thereof, an unimpeded passage-way to admit pressure-air to said first compartment prior to by-passing to said second compartment, a second valve, said second valve being operable in said passage-way to cut-off inflowing air and to permit exhaust thereof from said first compartment whereby upon unbalancing of air pressure within said compartments said first mentioned valve moves to its point of beginning thereby releasing accumulated pressure-air within said second compartment to said piston and piston cylinder, and means to permit exhaust of spent pressure air in said cylinder concurrently with forward movement of the piston, said means comprising apertures so located in the walls of the piston cylinder as to be uncovered by said piston in its power stroke.

6. The structure as defined in claim 5, including, and, means to evacuate air from said piston cylinder upon a return movement of the piston to its point of beginning for a next power stroke, said last mentioned means comprising vents in the walls of said housing and vents in said first mentioned valve, the vents in the valve being registrable with the vets in said housing upon compartmentation thereof by said valve.

7. A pneumatic power unit comprising: a housing forming an accumulator chamber; a pneumatic power unit communicating with said chamber; a valve controlling communication between said chamber and said power unit; a piston operatively connected to said valve; a cylinder in which said piston is slidable to open and close said valve; means for supplying pressure air to said cylinder on both sides of said piston and to said chamber; and a valve for venting the air on one side of said piston, whereby the air under pressure on the other side thereof will move said piston to open said chamber valve so as to admit air to said power unit.

8. A pneumatic power unit comprising: a housing forming an accumulator chamber; a pnuematic power unit communicating with said chamber; a valve controlling communication between said chamber and said power unit; a piston operatively connected to said valve; a cylinder in which said piston is slidable to open and close said valve; a passage-way communicating with opposite sides of said piston; a check valve controlling said passageway; yielding means normally urging said check valve toward a closed position; means for supplying pressure air to said cylinder on the side of said piston which will urge said piston toward main valve closing position, said check valve permitting the passage of air therethrough after said main valve is closed so as to fill said chamber and subsequently equalize the pressure on both sides of said piston; and a valve for venting the air on one side of said piston, whereby the air under pressure on the other side thereof will move said piston to open said chamber valve so as to admit air to said power unit.

*9. A pnuematic power unit comprising: a housing having an accumulator chamber, a pneumatic power unit including a cylinder having an opening at an inner end thereof communicating with said chamber, a piston including a piston head movable in a power stroke in said cylinder from a point of beginning adjacent to said inner end, and a driving member on and projecting from the piston head and beyond the opposite end of the cylinder to impart velocity to work; a valve seating on an annular stop adjacent said inner end of the cylinder and controlling communication between said chamber and said cylinder of the power unit; a valve-controlling piston operatively connected to said valve; a cylinder in which said valve-con-*

*trolling piston is slidable to open and close said valve; means for supplying pressure air to said last-mentioned cylinder on both sides of said valve-controlling piston and to said chamber; and a valve for venting the air on one side of said valve-controlling piston, whereby the air on the other side thereof will move said valve-controlling piston to open said chamber valve so as to admit accumulated pressure air within said chamber through said inner end of said power unit cylinder to drive said power unit piston in a power stroke from said point of beginning.*

*10. A pneumatic power unit comprising: a housing having an accumulator chamber, a pneumatic power unit including a cylinder having an opening at its inner end communicating with said chamber, a piston including a piston head movable in a power stroke in said cylinder from a point of beginning adjacent to said inner end, and a driving member on and projecting from the piston head and beyond the opposite end of the cylinder to impart velocity to work; a first valve seating on an annular stop adjacent said opening and controlling communication between said chamber and said cylinder of the power unit; a valve-controlling piston operatively connected to said first valve; a cylinder in which said valve-controlling piston is slidable to open and close said first valve; means for supplying pressure air to said last mentioned cylinder on both sides of said valve-controlling piston and to said chamber; a second valve for venting the air on one side of said valve-controlling piston, whereby the air on the the other side thereof will move said valve-controlling piston to open said first valve so as to admit accumulated pressure air within said chamber through said inner end of said power unit cylinder to drive said power unit piston in a power stroke from said point of beginning; and means to permit exhaust of spent pressure air from said power unit cylinder when the power unit piston returns to said point of beginning.*

*11. A pneumatic power unit comprising: a housing having an accumulator chamber, a pneumatic power unit including a cylinder having an opening at its inner end communicating with said chamber, a piston including a piston head movable in a power stroke in said cylinder from a point of beginning adjacent to said inner end, and a driving member on and projecting from the piston head and beyond the opposite end of the cylinder to impart velocity to work; a first valve seating on an annular stop about said opening and controlling communication between said chamber and said cylinder of the power unit; a valve-controlling piston operatively connected to said first valve; a cylinder in which said valve-controlling piston is slidable to open and close said first valve; means for supplying pressure air to said last mentioned cylinder on both sides of said valve-controlling piston and to said chamber; a second valve for venting the air on one side of said valve-controlling piston, whereby the air on the other side thereof will move said valve-controlling piston to open said first valve so as to admit accumulated pressure air within said chamber through said inner end of said power unit cylinder to drive said unit piston in a power stroke from said point of beginning; and means to permit exhaust of spent pressure air from said power unit cylinder when the power unit piston returns to said point of beginning, said last mentioned means including apertures so located in the walls of the power unit cylinder as to be uncovered by said power unit piston in its power stroke.*

*12. A pneumatic power unit comprising: a housing having an accumulator chamber, a pneumatic power unit including a cylinder having an opening at its inner end communicating with said chamber, a piston including a piston head movable in a power stroke in said cylinder from a point of beginning adjacent to said inner end, and a driving member on and projecting from the piston head and beyond the opposite end of the cylinder to impart velocity to work; a first valve seating on an annular stop about said opening and controlling communication between said chamber and said cylinder of the power unit; a valve-controlling piston operatively connected to said first valve; a cylinder in which said valve-controlling piston is slidable to open and close said first valve; means for supplying pressure air to said last mentioned cylinder on both sides of said valve-controlling piston and to said chamber; a second valve for venting the air on one side of said valve-controlling piston, whereby the air on the other side thereof will move said valve-controlling piston to open said first valve so as to admit accumulated pressure air within said chamber through said inner end of said power unit cylinder to drive said power unit piston in a power stroke from said point of beginning; and means to evacuate air from said power unit cylinder upon return movement of the power unit piston to said point of beginning, said last mentioned means comprising a vent passage through said first valve.*

*13. A pneumatic power unit comprising: a housing having an accumulator chamber, a pneumatic power unit including a cylinder having an opening at its inner end communicating with said chamber, a piston including a piston head movable in a power stroke in said cylinder from a point of beginning adjacent to said inner end, and a driving member on and projecting from the piston head and beyond the opposite end of the cylinder to impart velocity to work; a first valve seating on an annular stop about said opening and controlling communication between said chamber and said cylinder of the power unit; a valve-controlling piston operatively connected to said first valve; a cylinder in which said valve-controlling piston is slidable to open and close said first valve; means for supplying pressure air to said last mentioned cylinder on both sides of said valve-controlling piston and to said chamber; and a second valve for venting the air on one side of said valve-controlling piston, whereby the air on the other side thereof will move said valve-controlling piston to open said first valve so as to admit accumulated pressure air within said chamber through said inner end of said power unit cylinder to drive said power unit piston in a power stroke from said point of beginning; and means to permit exhaust of spent pressure air from said power unit cylinder when the power unit piston returns to said point of beginning, said second valve being mounted in said housing and having a valve stem extending from the housing and operative externally of the housing to actuate said second valve.*

References Cited in the file of this patent or the original patent

UNITED STATES PATENTS

| | | |
|---|---|---|
| 288,331 | Haskell et al. | Nov. 13, 1883 |
| 300,468 | Haskell et al. | June 17, 1884 |
| 402,228 | Burke | Apr. 30, 1889 |
| 746,337 | Junggren | Dec. 8, 1903 |
| 921,658 | Bachman | May 18, 1909 |
| 1,007,733 | Rhodes | Nov. 7, 1911 |
| 1,047,363 | Yarbrough | Dec. 17, 1912 |
| 1,879,184 | Gilmore | Sept. 27, 1932 |
| 1,945,238 | Sumner | Jan. 30, 1934 |
| 2,154,038 | Evrell | Apr. 11, 1939 |
| 2,389,942 | Thumin et al. | Nov. 27, 1945 |
| 2,458,714 | Mahoney | Jan. 11, 1949 |
| 2,488,192 | Hindle | Nov. 15, 1949 |
| 2,548,439 | Moffett | Apr. 10, 1951 |